United States Patent [19]
Kawaharasaki

[11] 3,883,895
[45] May 13, 1975

[54] CARTRIDGE CHANGER

[75] Inventor: Youichi Kawaharasaki, Yokohama, Japan

[73] Assignee: Victor Company of Japan, Limited

[22] Filed: June 13, 1973

[21] Appl. No.: 369,569

[30] Foreign Application Priority Data

June 14, 1972 Japan .......................... 47-70196[U]

[52] U.S. Cl. .................................................. 360/92
[51] Int. Cl. ........................ G11b 15/68; G11b 25/06
[58] Field of Search ......................... 360/92; 221/232

[56] References Cited

UNITED STATES PATENTS

| | | | |
|---|---|---|---|
| 3,477,726 | 11/1969 | Laschenski | 360/92 |
| 3,603,597 | 9/1971 | Haake | 360/92 |
| 3,756,608 | 9/1973 | O'Neill et al. | 360/92 |

*Primary Examiner*—Bernard Konick
*Assistant Examiner*—Robert S. Tupper
*Attorney, Agent, or Firm*—Robert E. Burns; Emmanuel J. Lobato; Bruce L. Adams

[57] ABSTRACT

A stack of cartridges carried by springs in a housing has its bottom cartridge playable by a tape player through a slot in a housing wall. Two parallel racks movable in opposite directions have end projections to push cartridges. One projection removes the top cartridge of the stack for subsequent play and simultaneously the other projection inserts a new bottom cartridge between the springs and the stack for play.

6 Claims, 9 Drawing Figures

CARTRIDGE CHANGER

This invention relates generally to a cartridge exchanger with particular reference to a cartridge exchange arrangement having a housing in which a plurality of preselected cartridges is stacked in first compartment of the housing and shifted from it towards a second compartment in a sequential and circulating manner within the housing.

The use of tape cartridges or cassettes is widespread because of their simple insertion-to-play operation and small storage space. However, a need has arisen to automate the change of cartridges when a plurality of cartridges is played successively. This invention therefore provides a cartridge change arrangement in which a predetermined number of cartridges is stacked on a plurality of spring means in a first compartment and at least one cartridge in a second compartment. As soon as a tape play has finished and the magnetic head of a tape player is disengaged from the open end of a cartridge, the uppermost cartridge of the stacked ones is automatically shifted towards the second compartment and allowed to fall into it and at the same time the cartridge perviously in the second compartment is moved towards the first compartment and squeezed between the lowermost cartridge and the spring means so as to keep a constant number of stacked cartridges resting on the spring means in the first compartment.

The advantages and features of the present invention will be more clearly understood from the following description taken in conjunction with the accompanying drawings, in which.

Figure 1:
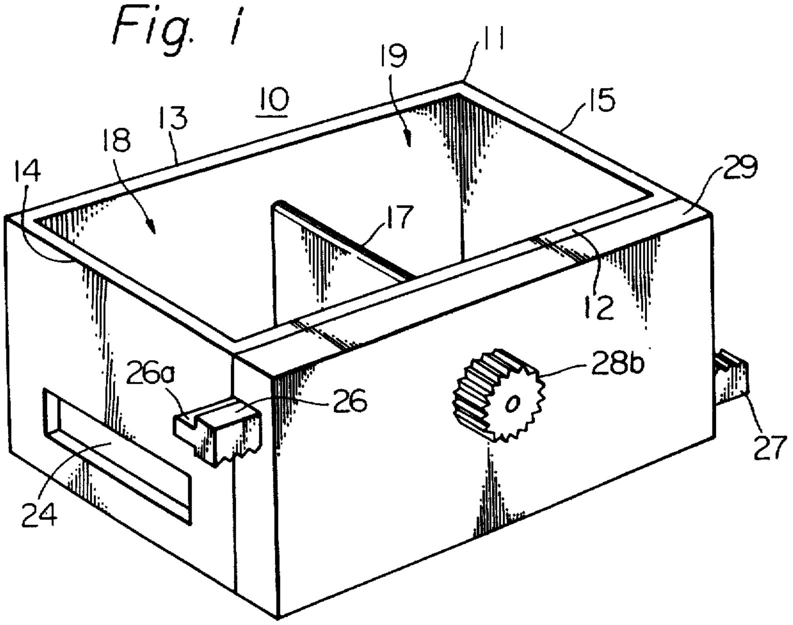
FIG. 1 is a perspective view of a tape cartridge changer in accordance with the present invention.
Figure 2:
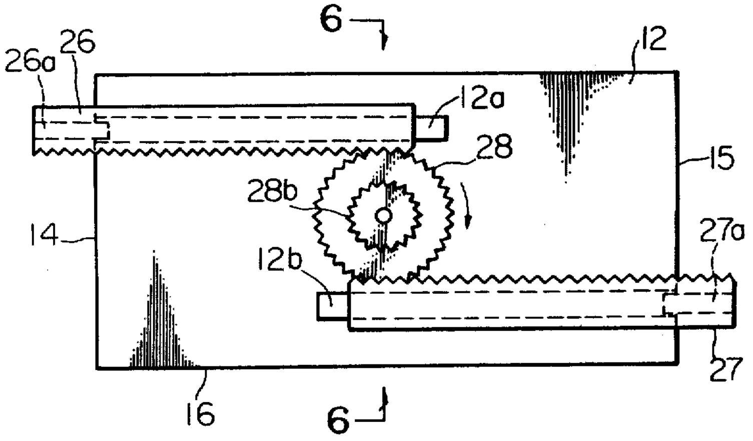
FIG. 2 is a front view in elevation of the cartridge changer with a front panel removed for illustration of a reciprocal rack-and-pinion arrangement.
Figure 3:
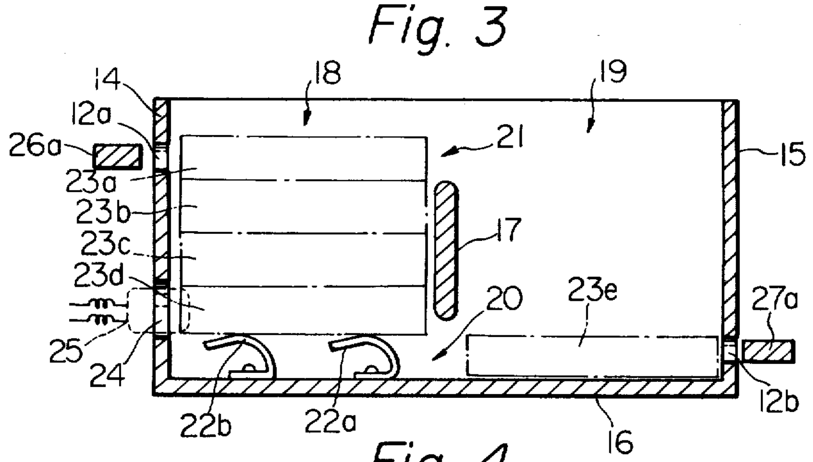
FIGS. 3 to 5 are vertical sectional views in elevation of the changer, for illustration of the working principle of the present invention.
Figure 7:
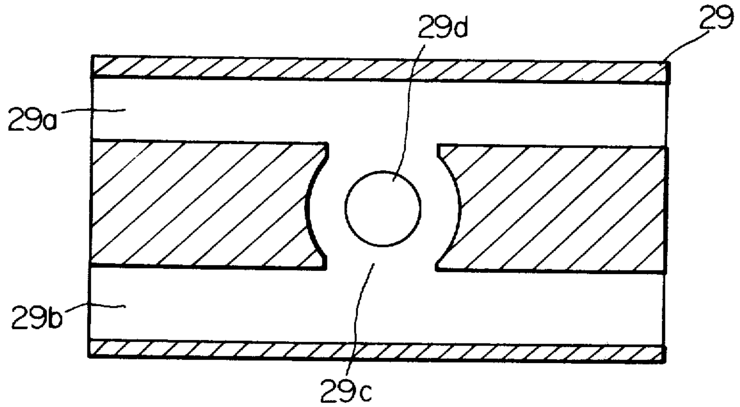
FIG. 7 is an inside view in elevation of the front panel of the changer.

Reference is now made to the drawings wherein like numerals indicate the same or corresponding parts throughout the several views. In FIGS. 1 and 2 there is shown a tape cartridge changer according to the present invention generally indicated at reference numeral 10. The tape cartridge changer comprises a housing 11 having a first or front wall 12 and a second or rear wall 13, side walls 14 and 15, and a bottom 16. The front wall 12 is provided with an upper slot 12*a* and a lower slot 12*b* in a vertically spaced, parallel relation to each other. The housing comprises a vertical guide member or partition 17 which substantially divides the housing 11 into two compartments 18 and 19, which have, respectively, the upper and lower slots 12*a*, 12*b* extending along the same. The vertical member 17 is spaced from the bottom 16 and the top end of the housing to provide a lower aperture or interspace 20 and an upper aperture or interspace 21 between the compartments 18 and 19 (FIG. 3). On the bottom 16 of the compartment 18 is seated a plurality of spring means, preferably leaf springs 22*a* and 22*b*. These leaf springs are screwed at one end thereof to the bottom 16 with the other end being bent in a direction away from the compartment 19. The compartment 18 is for storage of a plurality of cartridges 23*a* to 23*d* which rest on the leaf springs 22*a* and 22*b* which are bent downwardly by the weight acted upon them by the cartridges. The compartment 19 is for storage of the next cartridge, in this instance, a cartridge 23*e*. The side wall 14 is provided with a player head opening 24 to allow the magnetic head 25 of a tape player (not shown) to engage the front wall of the cartridge 23*d* when the tape player is put to play. The opening 24 thereby establishes a cartridge-playing position for the successive cartridges in the stack. A player-head aperture may alternatively be provided in the rear wall 13 or in the side wall 15. The cartridge changer 10 further comprises reciprocating means which comprises an upper toothed rack 26 and a lower toothed rack 27 positioned spacedly in parallel along the front wall 12, and a pinion 28 positioned therebetween meshing with the toothed racks to engage the racks to cause movement thereof reciprocally in opposite directions when rotated. The pinion 28 is mounted on a shaft 28*a* rotatable in the front wall 12 and has a small pinion 28*b* integrally formed with the pinion 28. The upper and lower racks 26 and 27 are each provided at one end thereof with lugs or projections 26*a* and 27*a*, respectively, which are slidably movable through the upper slot 12*a* and the lower slot 12*b*, respectively, and extend inwardly through the slots. The housing 11 further comprises a front panel 29 affixed to the front wall 12 (FIG. 7). The front panel 29 is made of, for example, a moulded plastic to form an upper groove 29*a* and a lower groove 29*b* spaced apart and parallel to each other so that the upper and lower racks 26 and 27 are slidably movable through the grooves 29*a* and 29*b*, respectively. In addition, the front panel 29 has a substantially circular depression 29*c* adjacent to the upper and lower grooves to accommodate the pinion 28 and a circular aperture 29*d* accommodating the pinion 28*b* (FIG. 7). The pinion 28*b* extends therefore externally of the front panel 29 so that it can be directly driven by a suitable external source or may be indirectly driven by a suitable rack arrangement such as rack 30 or a crown gear 31 (FIGS. 8 and 9).

Figure 4:
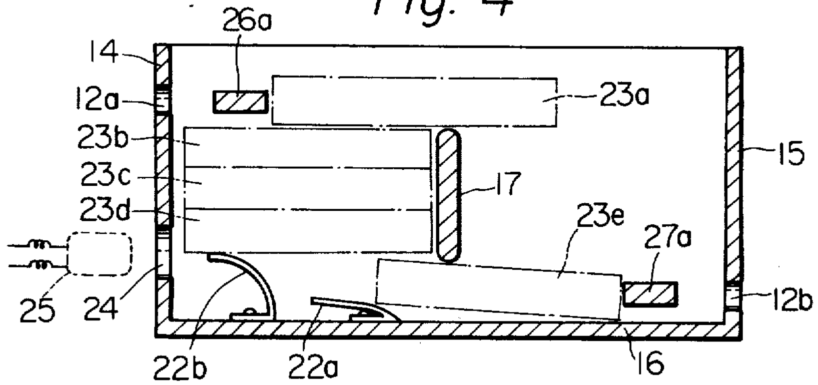
Figure 5:
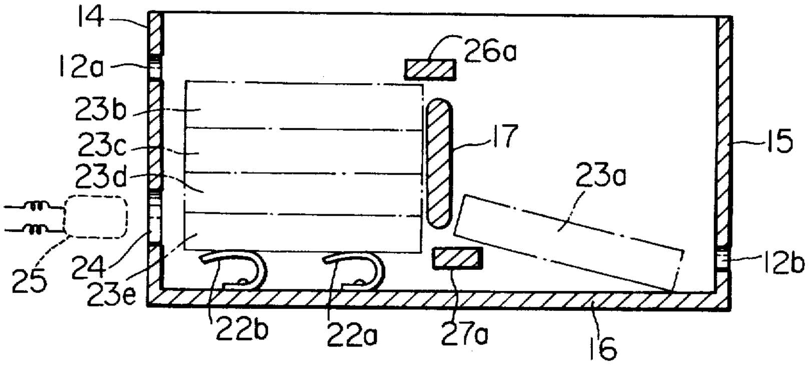
Figure 6:
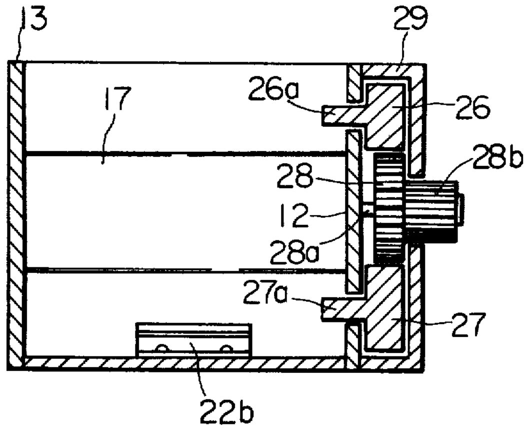
FIG. 6 is a cross-sectional end view of the changer taken along the line 6—6 of FIG. 2.
Figure 8:
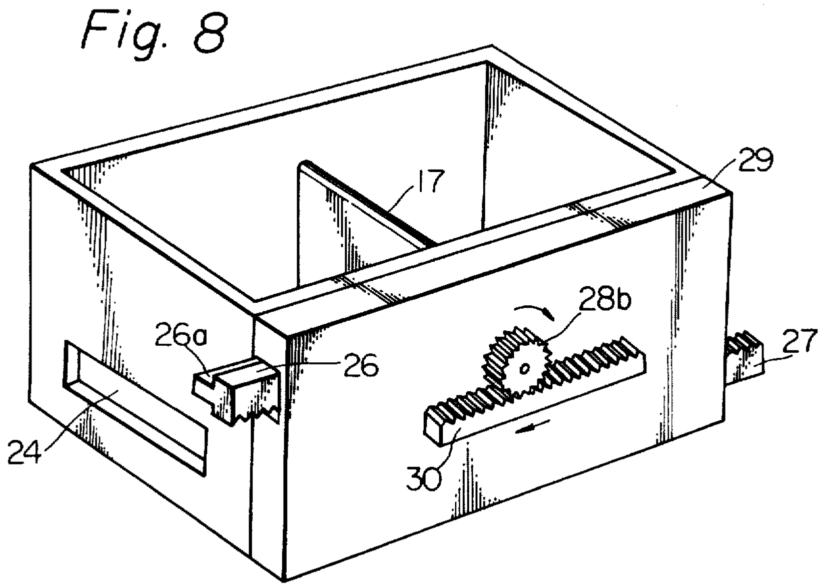
FIGS. 8 and 9 are perspective views of the cartridge changer for illustration of external drive means.

In operation, the pinion 28*b* is driven back and forth by an external source in the direction of an arrow shown in FIG. 8. The pinion 28 is caused to rotate in the direction of an arrow as shown in FIG. 2 to drive the upper rack 26 to the right and the lower rack 27 to the left. While the racks are being driven in opposite directions, the projection 26*a* pushes one end of the cartridge 23*a* to cause movement thereof towards the compartment 19. Simultaneously, the projection 27*a* pushes one end of the cartridge 23*e* to cause movement thereof towards the compartment 18. The cartridge 23*a* is moved over the upper edge of the vertical member 17 through the upper space 21 and enters the compartment 19. At the termination of the movement, the cartridge 23*a* falls on the bottom 16 of the compartment 19. Concurrently, the cartridge 23*e* is moved under the lower edge of the vertical member 17 through the interspace 20 towards the compartment 18. As it enters the compartment 18, the pressure exerted on the springs by the weight of the stacked cartridges is reduced because part of the weight of the cartridge 23*a* has been removed (FIG. 4). As it continues to move, the forward end of the cartridge 23e rides over the leaf spring 22a. At the termination of the movement, the cartridge 23e completely rests on the leaf springs 22a and 22n. In this instance, the cartridges 23b – 23d are pushed upwardly by the spring action and the cartridge 23e rises to a level sufficient to allow the next cartridge (in this case, cartridge 23b) to enter the position previously held by the cartridge 23a. It is to be noted that the springs are selected to be strong enough to provide an upward support, but flexible enough to allow introduction of the played cartridge. It is also to be noted that the height of the vertical guide member is selected to be substantially equal to the total height of the cartridges stored in the compartment 18 less the height of one cartridge, and that the upper edge of the vertical guide member may preferably be round-shaped to permit smooth movement. In addition, it is to be noted that the projections 26a and 27a are sufficiently long in the longitudinal direction of the racks to enable the projection 26a to acts as a stop against the upward movement of the stacked cartridges to allow it to slide over one edge of the uppermost cartridge as it returns to the normal position when the rack 26 is driven back. The projection 27a acts as a bumper which intercepts and endwise supports the falling cartridge in the compartment 19 so as to allow return movement of the rack 27 (FIG. 5). The projections may be spring-biased so that the projections can retract into the racks to allow return movement of the racks.

Figure 9:
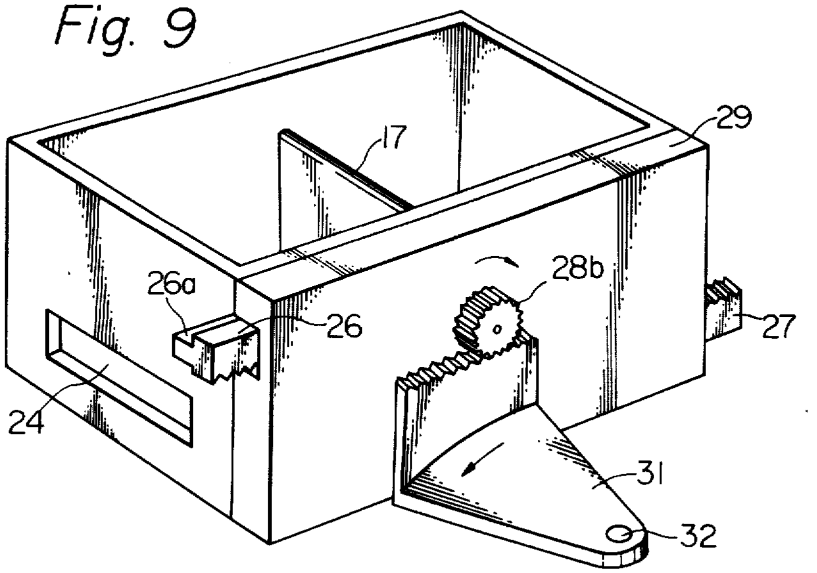

The cartridge changer according to the present invention can be driven by any suitable means such as shown in FIGS. 8 and 9. In FIG. 8, the pinion 28b is driven by a toothed rack 30 which is driven horizontally in opposite directions by any suitable known mechanism. FIG. 9 shows another form of drive means in which a crown gear 31 which rotates reciprocally about a pivot 32 engages the pinion 28b to cause reciprocal movement thereof. These arrangements allow the cartridge changer 10 to be readily engaged with or disengaged from the rack 30 or crown gear 31 with a plurality of cartridges loaded.

As will be apparent from the above, one reciprocal movement of the racks 26 and 27 completes a shift of cartridges from their original positions to the next during each interval between tape playings.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An automatic cartridge changer for use with a plurality of cartridges and a magnetic head, comprising:

a housing having a first wall which defines a pair of parallel, horizontal slots, the housing having a second wall which has an aperture for said magnetic head defining a cartridge playing and recording position in the housing;

cartridge guide means in said housing forming first and second compartments therein, said second compartment receiving a stack of cartridges, and said first compartment receiving a separate cartridge;

spring means in said second compartment for upwardly biasing the stack of cartridges to vertically align one of the stacked cartridges with said cartridge playing and recording position;

a pair of parallel horizontal gear racks vertically spaced apart and disposed along said first wall, each being horizontally moveable in opposite directions and each having, at one end of the rack, a lug projecting through and slidable along a corresponding one of said slots, said guide means defining upper and lower apertures between said first compartment and said second compartment for enabling the lug of one rack to push a separate cartridge from the second compartment into a lowermost position in the first compartment between said spring means and the stack to become a stacked cartridge, and for enabling the lug of the other rack to simultaneously push an uppermost stacked cartridge from the first compartment into the second compartment to enable it to fall therein and to become said separate cartridge; and a pinion located between and meshing with both gear racks for simultaneously moving them in mutually opposite directions to move their respective lugs and thereby to move said separate cartridge and an uppermost stacked cartridge in and from said second and first compartments respectively to said first and second compartments, to thereby change the alignment of stacked cartridges with said cartridge playing and recording position.

2. A cartridge changer according to claim 1 wherein said cartridge guide means has a height substantially equal to a multiple integer of the thickness of a cartridge.

3. A cartridge changer according to claim 1 wherein said cartridge guide means has a height substantially equal to "$n$—1" wherein "$n$" is the number of cartridges in the stack.

4. A cartridge changer according to claim 1 wherein said spring means comprises a plurality of leaf springs.

5. A cartridge changer according to claim 1 wherein one of said lugs is sufficiently long in the direction of the respective rack to intercept and support one end of the uppermost cartridge when that cartridge falls in said second compartment; the other lug being sufficiently long in the direction of its rack to stop the uppermost cartridge when the separate cartridge is pushed into a position between said spring means and said stack and when the stack is raised thereby.

6. A cartridge changer according to claim 1 wherein said second wall having said aperture for said magnetic head therein is perpendicular to said first wall.

* * * * *